US008561631B2

(12) United States Patent
Yung et al.

(10) Patent No.: US 8,561,631 B2
(45) Date of Patent: Oct. 22, 2013

(54) LIQUID IMPACT PRESSURE CONTROL METHODS AND SYSTEMS

(75) Inventors: Tin Woo Yung, Houston, TX (US); Haiping He, Spring, TX (US); Robert E. Sandstrom, Sugar Land, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 356 days.

(21) Appl. No.: 13/122,515

(22) PCT Filed: Oct. 12, 2009

(86) PCT No.: PCT/US2009/060366

§ 371 (c)(1), (2), (4) Date: Apr. 4, 2011

(87) PCT Pub. No.: WO2010/059307

PCT Pub. Date: May 27, 2010

(65) Prior Publication Data

US 2011/0209771 A1 Sep. 1, 2011

Related U.S. Application Data

(60) Provisional application No. 61/117,029, filed on Nov. 21, 2008.

(51) Int. Cl.
*B64D 37/32* (2006.01)
*B63B 25/14* (2006.01)

(52) U.S. Cl.
USPC ............................ 137/209; 137/206; 137/207

(58) Field of Classification Search
USPC ................................. 137/154, 206, 207, 209
See application file for complete search history.

(56) References Cited

U.S. PATENT DOCUMENTS

| | | | |
|---|---|---|---|
| 3,602,003 | A | 8/1971 | Hampton |
| 4,750,631 | A | 6/1988 | Hastings et al. |
| 4,922,671 | A | 5/1990 | Sato |
| 5,415,001 | A | 5/1995 | Powars |
| 5,821,964 | A | 10/1998 | Bidwell |

(Continued)

FOREIGN PATENT DOCUMENTS

| | | | |
|---|---|---|---|
| WO | WO 2006/052896 | A1 | 5/2006 |
| WO | WO 2008/072893 | A1 | 6/2008 |

OTHER PUBLICATIONS

Chuang, S., "Experiments on Slamming of Wedge-Shaped Bodies", Sep. 1967, Journal of Ship Research, pp. 190-198, vol. 11.

(Continued)

*Primary Examiner* — Craig Schneider
(74) *Attorney, Agent, or Firm* — ExxonMobil Upstream Research Company Law Department

(57) ABSTRACT

The present invention discloses apparatuses, systems, and methods for controlling liquid impact pressure in liquid impact systems. The liquid impact systems include at least one gas and a liquid, the gas having a density (PG) and a polytropic index (κ) and the liquid having a density (PL). The methods include the step of calculating a liquid impact load of the liquid on the object by determining a parameter Ψ for the system, wherein Ψ is defined as (PG/PL) (κ−1)/κ. The systems are also configured to utilize the parameter Ψ. The parameter Ψ may be adjusted to increase or reduce the liquid impact load on the system. Automatic, computer-implemented systems and methods may be used or implemented. These methods and systems may be useful in applications such as LNG shipping and loading/off-loading, fuel tank operation, manufacturing processes, vehicles dynamics, and combustion processes, among others.

38 Claims, 5 Drawing Sheets

(56) References Cited

U.S. PATENT DOCUMENTS

| | | | |
|---|---|---|---|
| 6,698,692 | B1 | 3/2004 | Tichenor et al. |
| 6,820,659 | B2 | 11/2004 | Sauer |
| 7,137,345 | B2 | 11/2006 | Noble et al. |
| 7,469,651 | B2 | 12/2008 | Sandstrom et al. |
| 2007/0194051 | A1 | 8/2007 | Bakken et al. |
| 2008/0011219 | A1 | 1/2008 | Bronneberg et al. |
| 2010/0162939 | A1 | 7/2010 | Morimoto |

OTHER PUBLICATIONS

Faltinsen, O. M., "Water Entry of a Wedge with Finite Deadrise Angle", Mar. 2002, Journal of Ship Research, pp. 39-51, vol. 46 No. 1.

Lee, D. H. et al, "A parametric sensitivity study on LNG tank sloshing loads by numerical simulations", Ocean Engineering, Nov. 18, 2006, pp. 3-9, vol. 34, No. 1, Elmsford, NY.

Lohner, R. et al., "Simulation of flows with violent free surface motion and moving objects using unstructured grids", International Journal for Numerical Methods in Fluids, 2006, pp. 1-24, John Wiley & Sons, Ltd.

Lugni, C. et al., "Wave impact loads: The role of the flip-through", 2006, Physics of Fluids, pp. 1-17, vol. 18.

Peregrine, D. H. , "Water-Wave Impact on Walls", 2003, *Annual Review of Fluid Mechanics*, pp. 23-43, vol. 35.

Wemmenhove, R., *Numerical Simulation of Two-Phase Flow in Offshore Environments*, May 16, 2008, Chapter 1-Introduction and Chapter 2-Numerical Model, pp. 1-17, Rijksuniversiteit Groningen.

Wemmenhove, R., *Numerical Simulation of Two-Phase Flow in Offshore Environments*, May 16, 2008, Chapter 3—Numerical Model, Chapter 4-Free Surface & Density, pp. 18-50, Rijksuniversiteit Groningen.

Xu, L., Drop Spashing on a Dry Smooth Surface, May 13, 2005, Physical Review Letters, pp. 1-4, vol. 94.

Yung, T. W. et al., "On the Physics of Vapor/Liquid Interaction During Impact on Solids", Journal of Ship Research, Sep. 2010, pp. 174-183, vol. 54, No. 3.

European Search Report, Jul. 22, 2009, 1 page.

LIQUID IMPACT PRESSURE CONTROL METHODS AND SYSTEMS

CROSS REFERENCE TO RELATED APPLICATIONS

This application is the National Stage of International Application No. PCT/US2009/060366, filed Oct. 12, 2009, which claims the benefit of U.S. Provisional Application No. 61/117,029, filed Nov. 21, 2008.

FIELD OF THE INVENTION

This invention relates generally to methods and systems for controlling liquid impacts. More particularly, this invention relates to a system, apparatus, and associated methods of controlling the transfer of liquid momentum into a solid in a liquid impact system containing a liquid, solid and gas.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Liquid impact loads are found in innumerable circumstances. Some of the most common impact systems are associated with liquid motion in confined spaces, which can include loading from fuel in fuel tanks (e.g. automobile, airline, or marine vessels), bulk liquid carriers (e.g. LNG tanker ships, oil tanker ships, milk tanker trucks, etc.); manufacturing processes (e.g. etching, engraving, painting, ink jet printing); vehicle dynamics where impact while coming in contact with fluid (e.g. airplane water landings, high speed planing craft), combustion processes, to name a few. In liquid carrying applications, it is generally desired to reduce the liquid impact load of the liquid on the container holding the liquid. This is most often accomplished by attenuation using a variety of specially designed internal shapes and protrusions. See, e.g. U.S. Pat. No. 7,469,651. The fuel in a fuel tank may be handled differently due to issues specific to combustible fuels and expansion of gasses at high altitudes. See, e.g. U.S. Pat. No. 6,698,692. The manufacturing cases have heretofore been viewed as non-analogous, but such a system includes a liquid impact on a solid object and the present disclosure may be applied to such systems to improve efficiency of jet dispersal, control diffusion or improve the momentum transfer.

Depending on fill level, LNG sloshing can be categorized into high-fill (fill level larger than 80%) and partial-fill conditions (fill level between 10%-80%). Partial-fill typically occurs during offshore cargo-transfer while high-fill typically occurs during LNG transportation. Offshore cargo-transfer may be preferable to onshore transfer for several site-specific reasons associated with onshore terminals (e.g. limited land, water depth, population congestion, etc.). However, the sloshing loads under partially filled conditions can be significant even under small sea states. As a result, it may be necessary to restrict offshore cargo-transfer to a small operation envelope (e.g. sea state with significant wave height 1.5~2.0 meters) to avoid conditions where the resulting sloshing impact pressure may damage the ship structure. This complicates cargo-transfer operations. Emergency suspension of discharge operations and evacuation from the terminal may be necessary if the sea state rises while loading or unloading. In other cases, LNG carriers may have to idly wait for cargo-transfer windows to open due to the small operation envelope. Both of these cases have a negative impact on offshore cargo-transfer operation economics and safety. For high-fill applications, there is still some risk of sloshing (e.g. liquid impact) damage in high seas or after a number of round trips.

Conventional approaches to the problem of sloshing generally rely on numerical methods. However, numerical method based approaches are generally deficient in that such methods cannot be scaled to size and are generally limited to providing qualitative (but not quantitative) information. For example, conventional approaches may predict the average force exerted on a structure in contact with a liquid but cannot adequately predict the actual force on a particular point or area of interest. Similarly, many prior art solutions to the sloshing problem have either not addressed partial fill sloshing issues, or require significant redesign of the container tanks (e.g., LNG tanks) themselves.

What is needed are methods and systems to accurately predict and control liquid impact loads on surfaces that are applicable over a wide range of applications. What is further needed is a solution to the sloshing problem that addresses the issues of partially filled liquid containers without requiring changes in the container's geometry, internals, or overall design.

SUMMARY

One embodiment of the present invention discloses a method of controlling a liquid-impact pressure on a solid body in a liquid impact system. The method includes providing a liquid impact system including both a gas and a solid body, wherein $\rho_G$ is a density of the gas, $\kappa$ is a polytropic index of the gas, and $\rho_L$ is a density of the liquid; calculating a parameter $\Psi$ for the system, wherein $\Psi$ is defined as $(\rho_G/\rho_L)(\kappa-1)/\kappa$, and adjusting the liquid-impact pressure by changing the parameter $\Psi$ for the system, wherein increasing the value of the parameter $\Psi$ decreases the liquid-impact pressure and decreasing the value of the parameter $\Psi$ increases the liquid-impact pressure. The method may further include changing the parameter $\Psi$ for the system in one or more of the following ways: 1) changing the pressure of the gas in the system, 2) changing the temperature of the gas in the system, 3) changing the composition of the gas in the system, and/or 4) changing the composition of the liquid in the system. In a particular embodiment, the liquid is liquefied natural gas (LNG) in an LNG container and the gas is ullage gas in the LNG container, and changing the parameter $\Psi$ for the system comprises changing the composition of the ullage gas by increasing the amount of an enhancement gas in the system, wherein the enhancement gas is selected from the group of gasses consisting of helium, neon, nitrogen, methane, and argon.

Another embodiment of the present invention discloses a method of optimizing a liquid impact pressure of a liquid on an object in a liquid impact system. The method including: a) determining an optimum liquid impact load of the liquid on the object; b) selecting an attribute consisting of at least one of a composition of the liquid, a composition of the gas, the temperature of the system, and a gaseous pressure of the liquid impact system; c) calculating a liquid impact pressure of the liquid on the object by determining a parameter $\Psi$ for the system, wherein $\Psi$ is defined as $(\rho_G/\rho_L)(\kappa-1)/\kappa$, wherein $\rho_G$ is a density of the gas, $\kappa$ is a polytropic index of the gas, and $\rho_L$ is a density of the liquid; d) comparing the optimum pressure with the calculated pressure; e) selecting one of the following: i) if the calculated pressure is not substantially equal to the optimum pressure: adjusting at least one of the liquid, the gas, and a gaseous pressure of liquid impact system, and repeating steps c)-e); or ii) if the calculated pressure is substantially equal to the optimum pressure, selecting the composition of the liquid, the composition of the gas, and the gaseous pressure of the liquid impact system.

A third embodiment of the present invention discloses a method of reducing a liquid impact pressure in a container. The method includes providing a liquid impact system, comprising: a liquid, a first gas, and a container having a liquid volume filled with the liquid, and an ullage volume substantially filled with the first gas, wherein the liquid has a density ($\rho_L$) and the gas has a density ($\rho_G$) and a polytropic index ($\kappa$); determining a parameter $\Psi$ for the liquid impact system, wherein the parameter $\Psi$ is defined as $(\rho_G/\rho_L)(\kappa-1)/\kappa$, and wherein an increase in the parameter $\Psi$ results in a decrease in the liquid-impact load on the container; and increasing the parameter $\Psi$ in the system, comprising a step selected from the group consisting of: increasing the pressure of the first gas in the container, replacing a portion of the first gas with a selected gas having a higher parameter $\Psi$, increasing the liquid volume in the container, decreasing a volume of boil-off gas, wherein the volume of boil-off gas is a result of boil-off from the liquid volume, and any combination thereof.

In a fourth embodiment of the present invention, a system for reducing a liquid impact load in a container is provided. The system includes: a liquid impact system, comprising: (i) a volume of liquid in a container, the liquid having at least a density ($\rho_L$); (ii) an ullage volume in the container containing at least an initial ullage gas, the initial ullage gas having at least a density ($\rho_G$) and a polytropic index ($\kappa$); a sensor system configured to determine at least the volume of liquid, the ullage volume, the liquid density ($\rho_L$), an ullage gas density ($\rho_G$), and an ullage gas polytropic index ($\kappa$); a calculator configured to calculate a parameter $\Psi$ for the liquid impact system, wherein $\Psi$ is defined as $(\rho_G/\rho_L)(\kappa-1)/\kappa$ and an increase in the parameter $\Psi$ results in a decrease in a liquid impact load in the container; and a controller configured to control at least one physical attribute of the liquid impact system to increase the value of the parameter $\Psi$.

BRIEF DESCRIPTION OF THE DRAWINGS

The foregoing and other advantages of the present techniques may become apparent upon reviewing the following detailed description and drawings in which.

DETAILED DESCRIPTION

Figure 1:
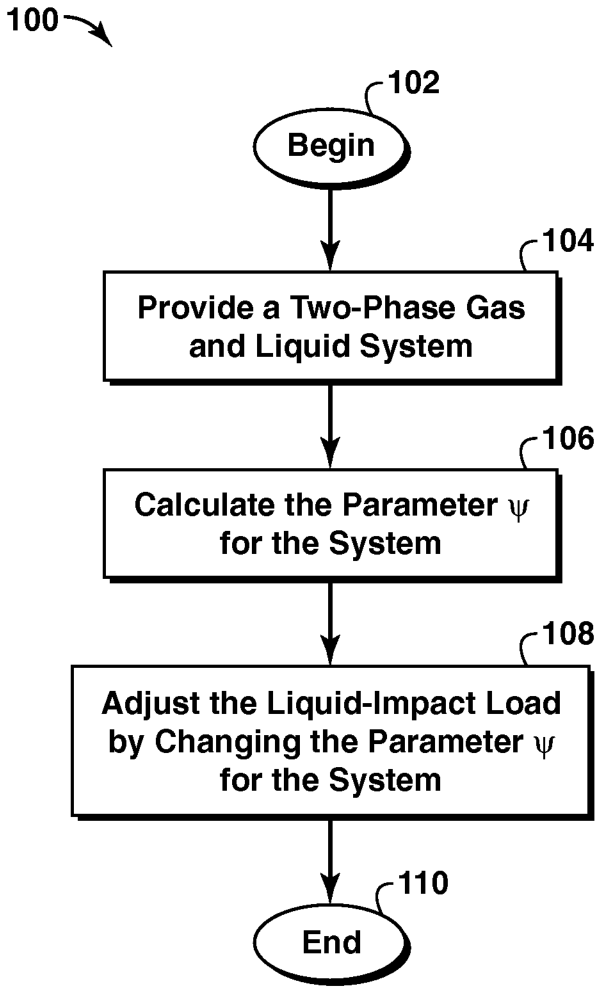
FIG. 1 is an illustration of a flow chart of an embodiment of a method of controlling a liquid impact load on an object in accordance with the present disclosure.

In the following detailed description section, the specific embodiments of the present techniques are described in connection with preferred embodiments. However, to the extent that the following description is specific to a particular embodiment or a particular use of the present techniques, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

The terms "gas" and "gas pressure" will generally refer to ambient gas or gas pressure rather than local gas or gas pressure. For example, in a liquid impact system having a container, the gas is the entirety of the gas in the ullage or gaseous portion of the system and the pressure is generally the ambient pressure caused by the gas on the system rather than a localized effect, although it may be possible to use some of the methods and systems disclosed herein to measure, control, or calculate such a local effect. In a second example, in a liquid impact system without a container, the gas is the gas contacting the free surface of the liquid (e.g. the ambient gas), which may be ambient air in some cases (e.g. vehicle landing on a water surface), a volume of gas moving at high velocity in some cases (e.g. the inkjet case), or some other type of system. Like in the container cases, the ambient case generally refers to the ambient gas and ambient gas pressure rather than a local gas or local gas pressure, but may be useful in determining a local pressure as well.

The term "ullage" refers to the volumetric portion of a container that does not contain liquid, wherein at least a portion of the container is filled with liquid.

The term "polytropic index," as used herein, refers to the real number $\kappa$ in the thermodynamic relationship $PV^\kappa=C$, where P is pressure, V is volume, and C is a constant. This equation can be used to accurately characterize processes of certain systems, notably the compression or expansion of a gas, but may also apply to liquids. The value of $\kappa$ depends on the state of the gas in the process. In an isobaric process (constant pressure), $\kappa=0$, in an isothermal process (constant temperature), $\kappa=1$, in an adiabatic process (no heat transfer) $\kappa$=the specific heat ratio ($\gamma$), and in an isocharic process (constant volume), $\kappa=\infty$. The polytropic index ($\kappa$) may be determined by any means, such as from a look-up table or from calculation of an equation. The specific heat ratio ($\gamma$) is $c_p$ divided by $c_v$, where $c_p$ is the specific heat capacity at constant pressure and $c_v$ is the specific heat capacity at constant volume, where $c_p=c_v+R$, where R is the universal gas constant.

Embodiments of the present invention generally relate to applications with a liquid impact on a solid surface. Particular embodiments of the present invention provide various means for reducing or increasing the impact pressure of a liquid, as well as concentrating or diffusing the transfer of liquid momentum onto a solid in a liquid impact system. In addition to liquid and solid surfaces, typical applications also include a gas phase, which is separated from the liquid phase by a free surface. In this light, the liquid impact system may be referred to as a two-phase gas and liquid system, which, in this disclosure means at least one of mixtures of two different fluids having different phases, such as Nitrogen (gas) and LNG (liquid), a single fluid occurring by itself as two different phases (e.g. LNG liquid and natural gas), or any combination thereof.

In one exemplary embodiment, a container with a solid surface is partially filled with a liquid and with the ullage occupied by a gas. Examples of this case include, but are not limited to: (1) transportation of LNG in a LNG carrier tank, where reduction of LNG sloshing loads on the tank is desirable; (2) jet engraving or ink jet printing, where controlling impact load, either through reduction or enhancement, is desirable; (3) vessel fuel tank applications, where reduction of fuel impact loads is desirable to reduce motion of the vessel and other potential hazards; (4) manufacturing processes (e.g. etching) where the impact load can directly influence quality control; (5) vehicles coming in contact with fluid (e.g. airplane water landings) where impacts can damage the vehicles; and (6) combustion processes where impact loads can cause corrosion, damage, or affect the efficiency of the process.

In one embodiment of the present invention, there is provided a method for controlling a liquid impact pressure (e.g. load, load over area, and load over time) of a liquid on an object in a liquid impact system. The gas has a density ($\rho_G$) and a polytropic index of the gas ($\kappa$) and the liquid has a density ($\rho_L$). The method includes calculating a parameter $\Psi$ for the two-phase system, then either decreasing the liquid impact load by increasing the parameter $\Psi$ or increasing the liquid impact load by decreasing the parameter $\Psi$. The parameter $\Psi$ may be changed by changing either the pressure or temperature of the gas in the system or changing the gas or liquid composition of the system. In some embodiments, the gas in the system will be comprised of more than one type of gas. For example, air is a mixture of primarily nitrogen, oxygen, and some argon. For such a system, the parameter $\Psi$ can be calculated for the mixed gas (e.g. air) or the components of the gas (e.g. nitrogen, oxygen, argon), depending on the ability to measure and control the components of the gas. In such a case, the composition of the mixed gas may be changed, resulting in a change to the parameter $\Psi$. Note that in most systems, changing the pressure may also affect the temperature and vice-versa, as shown in the thermodynamic relationships $PV \propto T$, where T is the temperature. Further note that depending on the specific type of system, the liquid may not be changed without destroying the purpose of the system (e.g. the composition of aviation fuel should not be changed to control liquid impact loads).

In an alternative embodiment, a method of optimizing a liquid impact load (e.g. pressure) of a liquid on an object in a liquid impact system is provided. The gas has a density ($\rho_G$) and a polytropic index ($\kappa$) and the liquid has a density ($\rho_L$). The method includes: a) determining an optimum liquid impact load of the liquid on the object; b) selecting an attribute consisting of at least one of the composition of the liquid, the composition of the gas, and a gaseous pressure of the two-phase liquid impact system; c) calculating a liquid impact load (e.g. pressure) of the liquid on the object by determining a parameter $\Psi$ for the system, wherein $\Psi$ is defined as $(\rho_G/\rho_L)(\kappa-1)/\kappa$, d) comparing the optimum pressure with the calculated pressure; and e) selecting an action based on the value of the parameter $\Psi$. If the calculated pressure is not substantially equal to the optimum pressure, then adjusting at least one of the liquid, the gas, and a gaseous pressure of the two-phase liquid impact system, and repeating steps c)-e); or if the calculated pressure is substantially equal to the optimum pressure, selecting the composition of the liquid, the composition of the gas, and the gaseous pressure of the liquid impact system. In this embodiment, the method may be used in any type of two-phase system, such as an ink jet printing system, a containerized system, or other type of two-phase gas and liquid system. The method may be manually employed, or may be aided by a processor-enabled system linked to a database configured to provide automated responses to dynamic conditions, initial system design, or some combination thereof. Persons of ordinary skill in the art will comprehend other applicable circumstances to apply this method.

In a third embodiment, a method of reducing liquid impact pressures in a containerized liquid impact system is provided. The method includes providing a two-phase gas and liquid system having a liquid, a first gas, and a container having a liquid volume filled with the liquid, and an ullage volume substantially filled with the first gas, wherein the liquid has a density ($\rho_L$) and the gas has a density ($\rho_G$) and a polytropic index ($\kappa$). The container may be a cargo container on an ocean-going vessel, a fuel tank on an airborne craft, a tank on a land-based carrier, or any other container configured to hold a liquid in a substantially liquid-tight environment. Next, the method includes determining the parameter $\Psi$ for the system, wherein an increase in the parameter $\Psi$ results in a decrease in the liquid-impact load on the container, then replacing at least a portion of the first gas in the ullage volume with the selected gas, wherein the selected gas has a higher parameter $\Psi$ than the first gas. Persons of ordinary skill in the art will comprehend other applicable circumstances to apply this method.

In a fourth embodiment, a system for reducing a liquid impact load in a container is provided. The system includes a volume of liquid in a container, the liquid having a density ($\rho_L$); an ullage volume in the container containing a first ullage gas, the first ullage gas having a density ($\rho_G$) a polytropic index ($\kappa$); a sensor system configured to determine at least the liquid density ($\rho_L$), the ullage gas density ($\rho_G$), and the ullage gas a polytropic index ($\kappa$); a calculator configured to calculate a parameter $\Psi$, wherein $\Psi$ is defined as $(\rho_G/\rho_L)(\kappa-1)/\kappa$, a controller configured to control the flow of the first ullage gas into and out of the container; and a selector operatively connected to the controller, the selector configured to select a second ullage gas, wherein the second ullage gas produces a higher $\Psi$ than the first ullage gas (the second ullage gas may also be referred to as a "low-load" ullage gas).

In any of the embodiments of the disclosed processes and systems, the liquid impact system may comprise an LNG container on an LNG ship configured to hold LNG, LPG, or other liquefied gaseous hydrocarbon. The LNG container may be a membrane tank, a corrugated tank, a spherical tank, or another type of tank for holding LNG. The controller may be a manually operated system such as a valve and tank system, or may be an automatically controlled system such as a processor operatively connected to a memory storage and access device (e.g. RAM or hard drive), a database, a set of control algorithms, etc. Persons of ordinary skill in the art will comprehend other means to employ this system.

Referring now to the drawings, FIG. 1 is an illustration of a flow chart of an embodiment of a method of controlling a liquid impact load on an object in accordance with the present disclosure. The process 100 begins at block 102 and includes providing 104 a liquid impact system having a solid body, wherein $\rho_G$ is a density of the gas, $\kappa$ is a polytropic index of the gas, and $\rho_L$ is a density of the liquid. Then, calculating 106 a parameter $\Psi$ for the system, wherein $\Psi$ is defined as $(\rho_G/\rho_L)(\kappa-1)/\kappa$, and changing 108 the liquid-impact pressure (e.g. load, load over area, and/or load over time) by changing the parameter $\Psi$ for the system, wherein increasing the value of the parameter $\Psi$ decreases the liquid-impact pressure and decreasing the value of the parameter Ψ increases the liquid-impact pressure. The process 100 ends at block 110.

In some embodiments, the provided 104 two-phase liquid impact system may be any one of a liquid storage container system, a fuel container system, an ink jet printing system, or another system having at least a solid surface, a gas portion, and a liquid portion, wherein the liquid portion contacts the solid surface an imparts a force or pressure thereto. In the liquid storage and fuel container exemplary systems, the liquid impact is primarily due to sloshing of the liquid inside the container or tank and preferably the liquid impact pressure is decreased. In the ink jet printing system, the ink is the liquid, a piece of paper is the solid surface, and a gas surrounding the jet of ink is the gas. In this exemplary system, the liquid impact is the ink jet on the paper and preferably the liquid impact is increased.

Note that the gas must be compatible with the two-phase system. Compatibility may be determined by a number of factors, such as flammability, toxicity, solubility with the liquid, environmentally friendly, lower boil-off temperature than the liquid, relative cost and/or availability and any combination of these factors.

The step of calculating 106 the parameter Ψ for the system may be done by any reasonable means known to persons of ordinary skill in the art. For example, the parameter Ψ may be calculated manually by an operator whenever certain threshold conditions are met, such as detection of liquid impact loads that are outside engineered tolerances. Alternatively, the parameter Ψ may be calculated using an automated computer system having a processor, RAM, storage and connection to a database or network for obtaining density and polytropic index values for various gas and liquid systems. Yet another alternative includes looking up the parameter Ψ in a pre-calculated table of values for a given system, such as values of the parameter Ψ for an LNG system.

The step of adjusting 108 the liquid-impact load by changing the parameter Ψ for the system includes at least changing the pressure of the gas in the system, changing the temperature of the gas in the system, changing the composition of the gas in the system, changing the composition of the liquid in the system, and any combination of these. For liquid container systems such as the fuel tank example or the liquid container example, the level of the liquid also changes the parameter Ψ of the system by changing the pressure of the ullage gas. This liquid fill-level can be the largest single factor during on-loading or off-loading operations, particularly when such operations are conducted at a high sea state for the exemplary LNG container system.

More specifically, when the system is the exemplary LNG container for transporting LNG, the liquid is LNG, which will not be changed. It should be noted that the LNG contemplated is "commercial grade" LNG, which is substantially pure, but will include contaminants that are well known to persons of skill in the LNG arts. In this exemplary case, the ullage gas will generally be the boil-off gas from the LNG and will have the same or similar composition as the LNG. As such, it will contain primarily methane, but also include some of the contaminants, particularly if those contaminants have a substantially equivalent boil-off temperature to the methane. However, changing the parameter Ψ for the system may include changing the composition of the ullage gas by increasing the amount of an "enhancement gas" in the system, such as helium, neon, nitrogen, methane, or argon.

One feature of the LNG example is that during transport, a portion of the LNG may boil-off to produce an additional volume of natural gas in the ullage volume of the container. This may increase pressure and will likely change the parameter Ψ during transport of LNG. Such a change may call for removing some of the methane or injecting another gas into the ullage volume to compensate for the addition of the natural gas. In one particular example, the LNG container may include a pressure release valve with a pressure setting. Such valves are common and typically configured to avoid significant pressure increases inside the LNG container during transport. However, as noted above, a slightly higher ullage gas pressure (within engineering tolerances) may result in decrease sloshing loads. In such a case, it may be preferable to increase the pressure setting on the pressure release valve to reduce sloshing loads. Further, the parameter Ψ must be accounted for during on-loading or off-loading operations at an offshore terminal. This may include injecting more ullage gas during offloading to maintain a sufficiently high parameter Ψ to permit off-loading during a rough or high sea state, changing the composition of the ullage gas to achieve the desired Ψ level, or a combination of these.

After using the ullage gas to achieve the desired Ψ, the ullage gas may be recovered at either a cargo-transfer (e.g. import) terminal or an export terminal or restored to have characteristics more typical of normal LNG operations. For the export case, the ullage gas (e.g. nitrogen) may be displaced as tanks are filled with LNG after the ship returns to the export terminal. The displaced gas may be reused at the export terminals for other purposes, such as feedstock for inert gas or refrigerant. For the cargo-transfer case (e.g. import terminal) the ullage gas may be restored in the LNG ship by injecting methane back in the tank until gas composition is restored or by trading the ullage gas with methane and storing the ullage gas. Beneficially, the taught methods will be increasingly important for at least the LNG industry from both economic and operational safety viewpoints.

Note that the steps of calculating and adjusting may be accomplished by the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 2:
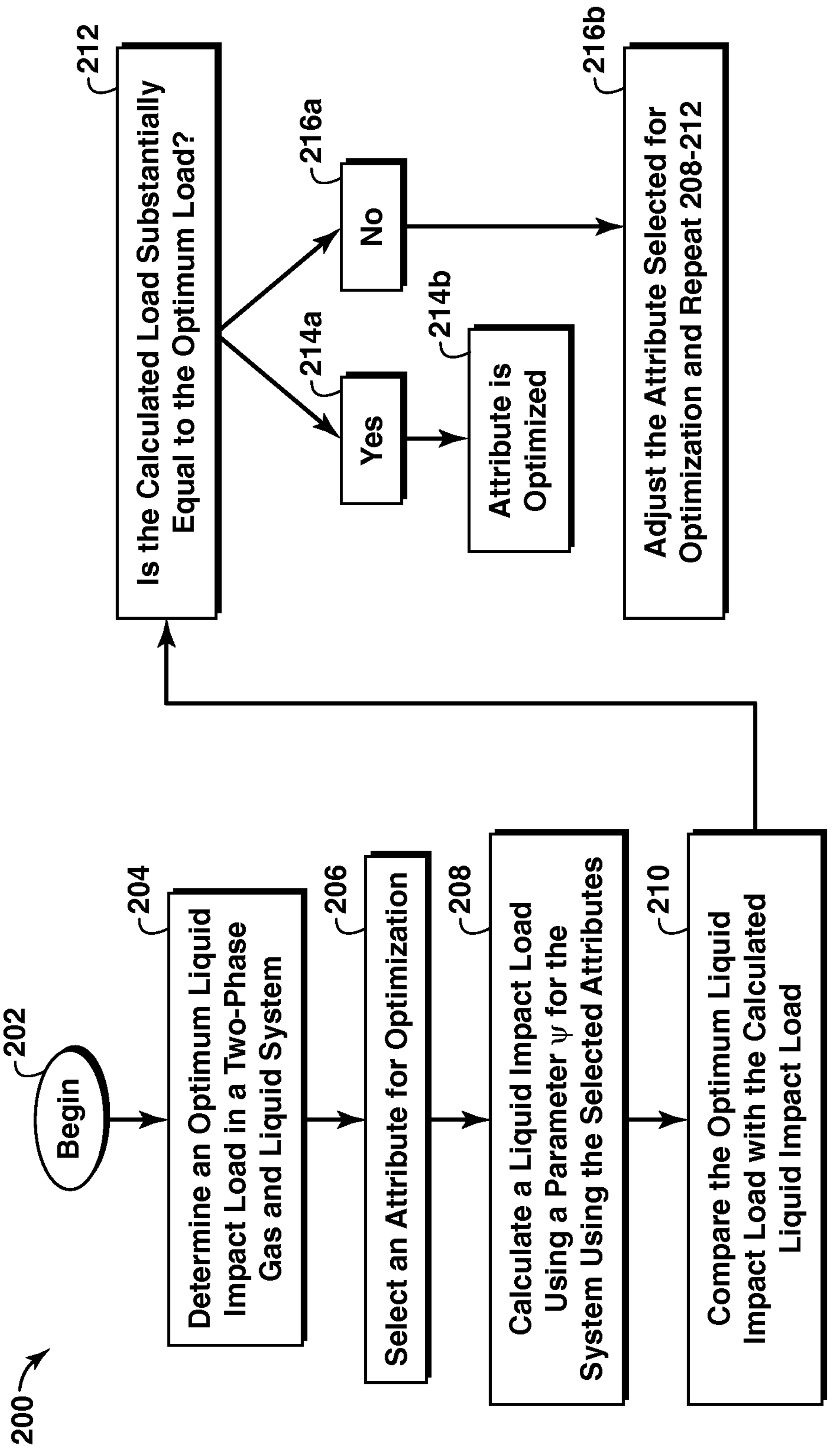
FIG. 2 is an illustration of a flow chart of an embodiment of a method of optimizing a liquid impact load on an object in accordance with the present disclosure.

FIG. 2 is an illustration of a flow chart of an embodiment of a method of optimizing a liquid impact load on an object in accordance with the present disclosure. The method 200 begins at block 202 and includes determining 204 an optimum liquid impact load of the liquid on the object in a liquid impact system. The method further includes selecting an attribute 206 for optimization from the group of attributes including the type of liquid, the type of gas or mixture of gas (e.g. compositions of the gas and liquid), the pressure of the system, and the temperature of the system; and calculating 208 a liquid impact load on the object using the parameter Ψ, wherein the parameter Ψ is defined as $(\rho_G/\rho_L)(\kappa-1)/\kappa$, wherein $\rho_G$ is a density of the gas, κ is a polytropic index of the gas, and $\rho_L$ is a density of the liquid. Next, comparing 210 the optimum load with the calculated load and if they are substantially the same 214*a*, then the attribute is optimized 214*b*, but if they are not substantially the same 216*a* the adjusting the attribute and repeating 216*b* steps 208-212 until the optimum load and the calculated load are substantially the same.

Figure 3:
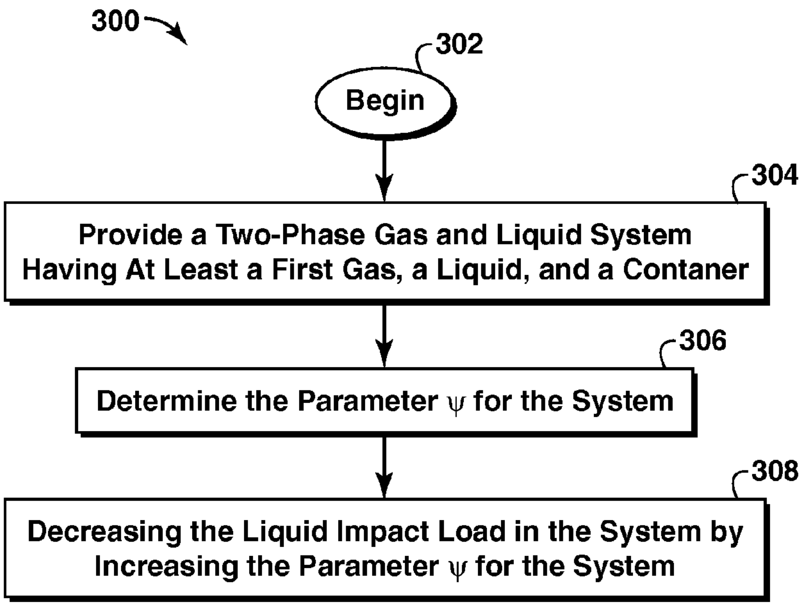
FIG. 3 is an illustration of a flow chart of an embodiment of a method of reducing a liquid impact load in a container in accordance with the present disclosure.

FIG. 3 is an illustration of a flow chart of an embodiment of a method of reducing a liquid impact load in a container in accordance with the present disclosure. The process 300 begins at block 302 and includes providing 304 a liquid impact system, comprising: a liquid, a first gas, and a container having a liquid volume filled with the liquid, and an ullage volume substantially filled with the first gas, wherein the liquid has a density ($\rho_L$) and the gas has a density ($\rho_G$) and a polytropic index ($\kappa$). Next, the method includes determining or calculating 306 a parameter $\Psi$ for the two-phase system, wherein the parameter $\Psi$ is defined as $(\rho_G/\rho_L)(\kappa-1)/\kappa$. Note that decreasing the parameter $\Psi$ increases the liquid impact load on the system and in most cases, the relationship is not linear, but has a shape affected by the type of system. The method then includes increasing 308 the parameter $\Psi$ of the system.

The step of increasing the parameter $\Psi$ of the system 308 may be executed by one of the following approaches: increasing the pressure of the first gas in the container, replacing at least a portion of the first gas with a selected gas having a higher parameter $\Psi$, increasing the liquid volume in the container, and decreasing a volume of boil-off gas, wherein the volume of boil-off gas is a result of boil-off from the liquid volume.

Figure 4:
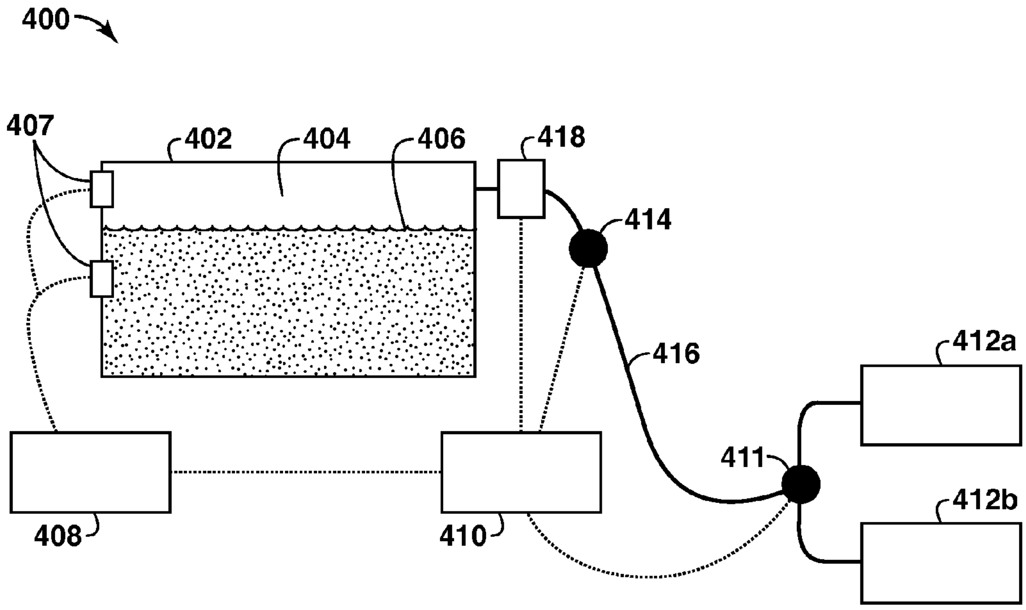
FIG. 4 is an illustration of a system for reducing a liquid impact load in a container.

FIG. 4 is an illustration of a system for reducing a liquid impact load in a container in accordance with the method of FIG. 3. As such, the system of FIG. 4 may be best understood with reference to FIG. 3. The system 400 includes a container 402 having an ullage volume 404 containing at least a first ullage gas with a density ($\rho_G$) and a polytropic index ($\kappa$), and a volume of liquid 406, the liquid having a density ($\rho_L$). The system 400 further includes a sensor system 407 to take measurements of system variables, including liquid volume, ullage volume, liquid density ($\rho_L$), ullage gas density ($\rho_G$), and ullage gas polytropic index ($\kappa$). A calculator 408 is operatively connected to the sensors 407 and configured to calculate a parameter $\Psi$, wherein $\Psi$ is defined as $(\rho_G/\rho_L)(\kappa-1)/\kappa$. The calculator 408 is connected to a controller 410 configured to control a valve 414 configured to control the flow of the ullage gas from an ullage gas holding location 412*a*-412*b* via a flow line 416. A pump 418 may also optionally be added to the system 400 controlled by the controller 410 to adjust the gas pressure of the system 400.

In some embodiments, there may be only one ullage gas holding location 412*a*, but there may be two or more, depending on the system, space available, and other factors. When more than one tank is used, there will also be a selector 411 operatively connected to the controller 410 for selecting and apportioning the amount of gas from each location 412*a*-412*b* depending on the circumstances.

In one exemplary embodiment, the container 402 is an LNG tank, which may be any type of LNG tank, but is most likely a standard membrane-type tank as found on the majority of the world's LNG carriers. In this example, the system 400 may be implemented into existing LNG carriers with little or no modification of the tank. For example, some modern LNG carriers may already include active leak detection systems (or rupture detection systems) and it may be relatively inexpensive to integrate or modify at least some of the sensors 407, such as pressure sensors, into such a system to additionally monitor sloshing loads. The system 400 will also include a data acquisition system (DAQ) (not shown), which may be a standard DAQ known to those of skill in the art and which may already be incorporated into many LNG carriers. In the LNG example, the liquid 406 is LNG (or optionally LPG or another liquefied gas product) and the gas 404 is typically methane, which is the boil-off gas from the LNG.

In the exemplary LNG embodiment, the calculator 408 may be specially constructed for the required purposes, or it may comprise a general-purpose computer selectively activated or reconfigured by a computer program stored in the computer. Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)). The calculator 408 may also be in communication with a network connection, a display and input device such as a monitor and a keyboard. The calculator 408 may be configured to receive the data from the sensors 407 and calculate the parameter $\Psi$, which may then be utilized by the controller 410.

In most embodiments, the controller 410 is configured to receive information such as the data from the sensors 407, the value of the parameter $\Psi$ from the calculator 408, and information from an operator (e.g. sea state, availability of other ullage gasses, predicted or optimum liquid impact load on the system, operating states of various equipment such as the pump 418, valve 414, sensors 407, and other information). The controller 410 is further configured to send information and instructions to the operator and the equipment, as needed or desired. As such, the controller 410 preferably includes input and display devices and a permanent storage device such as a hard drive. In one exemplary embodiment, the calculator 408 and the controller 410 may be integrated into a single unit.

It should be understood that the holding locations 412*a*-412*b* should be construed broadly enough to include sources of gas and locations to vent gasses (if venting is appropriate) and are not necessarily limited to enclosed tanks. For example, in some applications, atmospheric air may be selected as an appropriate ullage gas (note, air may not be appropriate for the LNG case because the oxygen in air may react with the LNG boil-off gas). If air separation units (ASU) become more efficient and effective, it may be reasonable to utilize an ASU to remove the oxygen from the air leaving primarily inert gasses (e.g. nitrogen and argon) for use as an ullage gas 404. In such an exemplary case, the holding location 412 would be the ASU (not shown). In many embodiments, the holding locations 412*a*-412*b* are tanks for holding gas and configured to deliver or receive gas depending on the circumstances.

In some embodiments, the holding locations 412*a*-412*b* may be the largest item added to an existing LNG carrier, but these locations 412*a*-412*b* are preferably much smaller than even one LNG storage container 402 and may suitably be placed on the deck of the LNG carrier without adding undue operational risk or inconvenience. Some LNG ships already incorporate such tanks to handle LNG boil-off (methane) for safety reasons, making a retrofit of an existing LNG carrier with the presently disclosed system relatively inexpensive.

The valve 414 may be any type of flow valve appropriate for controlling the flow of gasses through a flow line 416. The valve 414 should further be capable of permitting flow in two directions. A person of ordinary skill in the art would understand the types of valves that may be used in the system 400. Similarly, the flow line 416 may be any type of flow line appropriate for transporting gaseous fluids from one location to another at a high enough rate and pressure to effectively operate the system 400. Likewise, the pump 418 should be capable of handling the gaseous pressures and volumes contemplated in the system 400, which will vary depending on the type of system. A person of ordinary skill in the art understands that a variety of valves 414, flow lines 416, and pumps 418 are operable in the system 400 when utilized for their intended purposes.

EXAMPLES

Figure 5A:
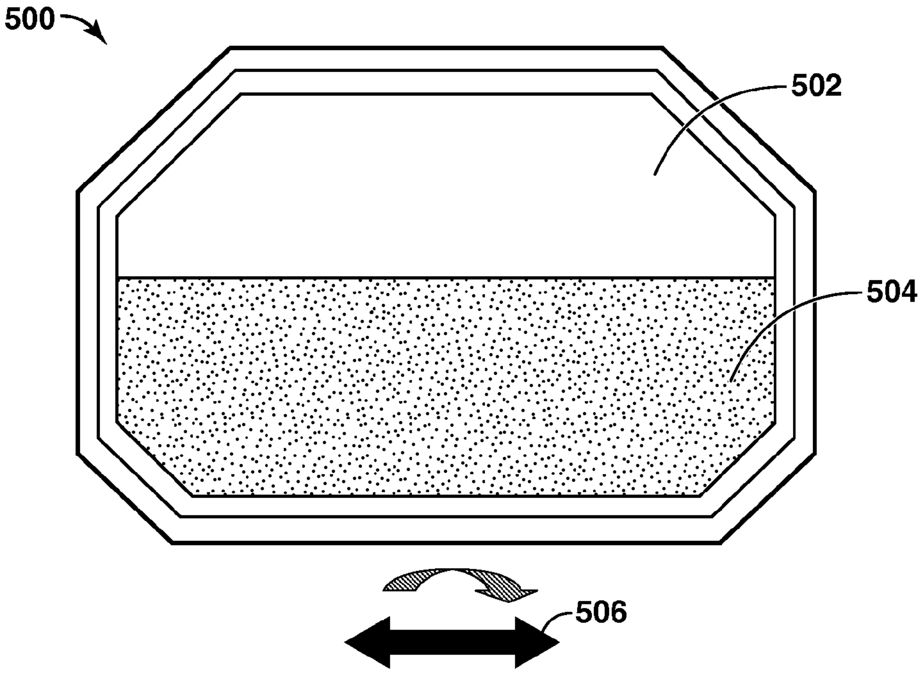
FIGS. 5A-5B are an illustration of a LNG tank cross-section and a schematic of an experimental setup for measuring liquid impact loads in an LNG container using the parameter $\Psi$ as disclosed in the methods and systems of FIGS. 1-4.
Figure 5B:
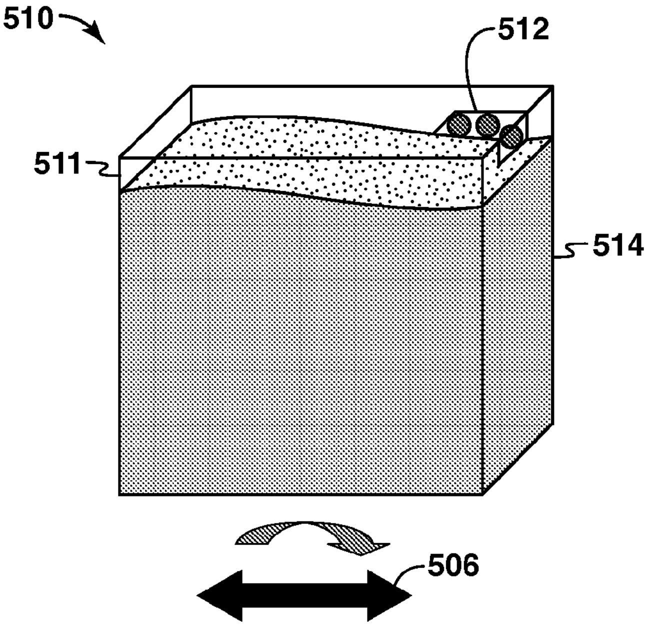

FIGS. 5A-5B are an illustration of an exemplary LNG membrane tank cross-section and a schematic of an experimental setup for measuring liquid impact loads in an LNG container using the parameter Ψ as disclosed in the methods and systems of FIGS. 1-4. As such, FIGS. 5A-5B may be best understood with reference to FIGS. 1-4. FIG. 5A is a schematic cross-section 500 of a typical LNG membrane tank filled with liquid 504 and ullage gas 502. Arrows 506 show the expected relative motion of the tank 500. FIG. 5B is a schematic 510 of an experimental tank 511 showing sensing devices 512 for measuring the sloshing impact pressure. The liquid 514 is also shown sloshing around and the arrows 506 show the expected motion of the tank 511.

One exemplary method of reducing the liquid impact load in a two-phase gas and liquid system comprises liquefied natural gas (LNG) and natural gas (e.g. primarily methane) in an LNG tank. More specifically, the model describes the exemplary LNG offshore offloading case wherein the tank 500 is under partial-fill conditions. First, the LNG level decreases to model LNG being discharged from the tank 500. Second, the ullage space 502 is filled with a gaseous mixture that includes nitrogen ($N_2$) at cryogenic temperatures similar to LNG. The nitrogen injection is kept at a rate that the ullage pressure (e.g. gaseous pressure) remains substantially equal to atmosphere pressure (e.g. about 14.7 psi or 101 kPa). Nitrogen can be provided by a nitrogen-generator on-board an offshore terminal, which can be generated in advance and stored in a liquid form (e.g. in holding areas like 412) or provided by an ASU or other device. Third, nitrogen injection stops as the LNG cargo-transfer finishes.

Nitrogen is a good choice as an ullage gas in an LNG system because it meets all of the following criteria: lower boil-off temperature than LNG, inert and non-toxic gas, minimum environmental impact, available in large quantities, inexpensive, low solubility in LNG and able to maintain LNG quality. Importantly, the combination of nitrogen and LNG forms a parameter Ψ that is larger than the methane and LNG combination. As shown below in Table 1, the parameter Ψ of nitrogen/LNG is almost twice the number of methane/LNG. Table 1 also lists argon and helium data. As can be seen, argon can potentially reduce the impact loads further while helium can result in a significant increase of impact loads.

TABLE 1

Impact pressures of various gasses in an LNG system

| Ullage gas | Boil-off Celsius | κ (polytropic index) | Density at −161 deg C. | Ψ at −161 deg C. | Impact Pressure |
|---|---|---|---|---|---|
| NG Vapor | −161 | 1.32 | 1.83 | 0.00097 | 24.88 |
| Nitrogen | −196 | 1.4 | 3.00 | 0.00186 | 12.31 |
| Argon (Ar) | −186 | 1.67 | 4.28 | 0.00373 | 5.85 |
| Helium (He) | −269 | 1.66 | 0.43 | 0.00037 | 69.18 |

The extent of sloshing impact pressure reduction can be demonstrated by a 2D sloshing test, such as the one disclosed herein. These tests utilize a 2D pressurized tank 500. The tank 500 was filled with boiling water 502 and the ullage 504 was filled with boiling vapor (or steam). Under a typical testing condition, the vapor and liquid reached thermal equilibrium. The effect of the parameter Ψ was demonstrated by varying testing temperature which results in a change of vapor density ($\rho_G$). This effect was further confirmed by testing with different ullage gas compositions and pressures. As a result, sloshing loads from methane/LNG and nitrogen/LNG are expected to follow a similar trend.

Figure 6:
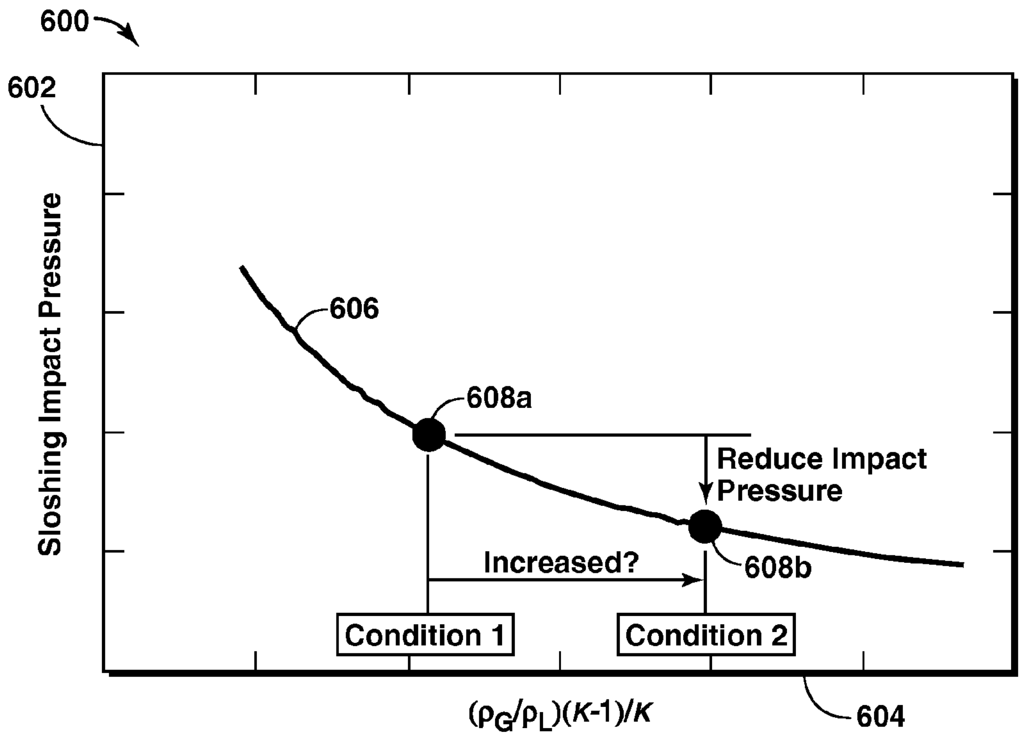
FIG. 6 is an exemplary graph plotting sloshing impact load (or pressure) against a parameter $\Psi$.

FIG. 6 is an exemplary graph plotting sloshing impact load (or pressure) against a parameter Ψ. The graph 600 compares the sloshing impact pressure 602 versus the parameter Ψ 604 (no units). The plot further includes a curve 606 showing the interaction of the variables pressure 602 and Ψ 604. Two points 608*a* and 608*b* are also shown plotting two different conditions and the approximate change in pressure 602 compared with the approximate change in Ψ 604. Viewing the curve 606, it should be apparent that under some conditions it might take a rather large change in Ψ to significantly lower the pressure. One useful calculation might include the derivative of the curve (dP/dΨ) to determine the potential effectiveness of a change in the parameter Ψ.

Figure 7:
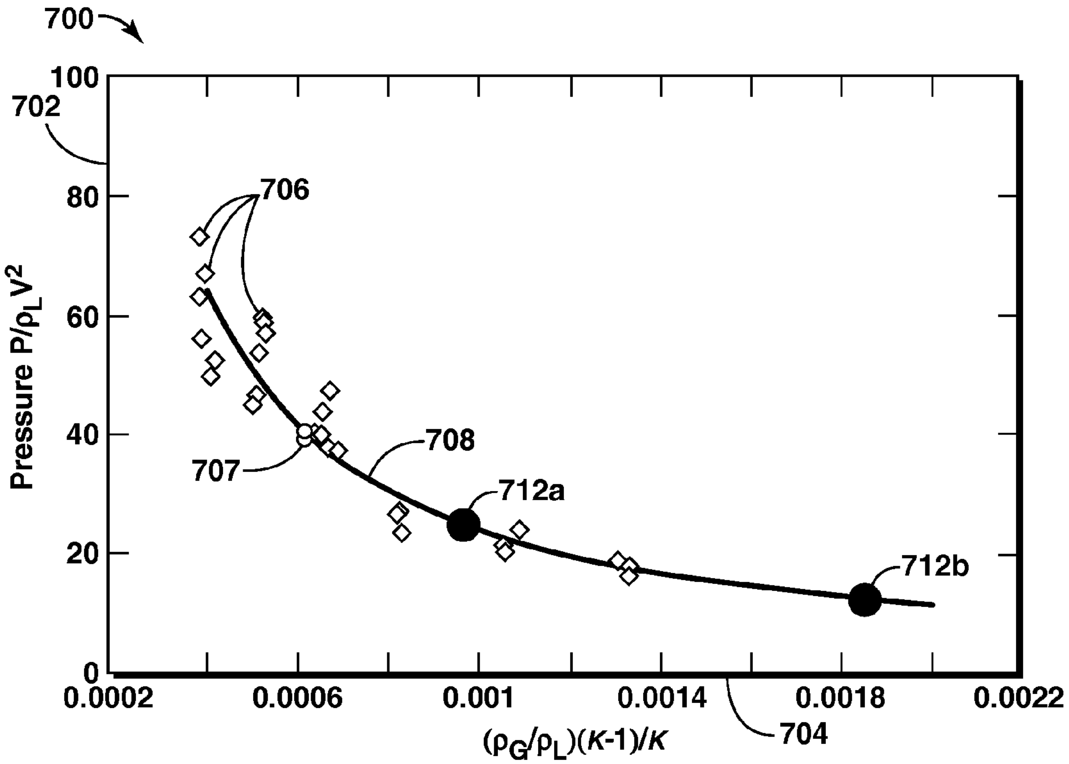
FIG. 7 is a plot of experimental results comparing sloshing impact load against the parameter $\Psi$.

FIG. 7 is a plot of experimental results comparing sloshing impact load against the parameter Ψ. The graph 700 includes pressure 702 (non-dimensional) versus the parameter Ψ 704. The diamonds 706 in the plot indicate experimental data from steam/water testing. The circles 707 in the plot show the experimental data from heavy gas/water testing. The solid curve 708 is a fitting curve of the experimental data. In the plot 700, conditions with methane/LNG and nitrogen/LNG are labeled as circles 712*a* and 712*b*, respectively. As can be seen, the impact pressure 702 is expected to decrease almost by half as Ψ 704 increases from methane/LNG to nitrogen/LNG. Although the tests were conducted at high-fill condition, a similar trend is expected for partial-fill conditions.

From the above disclosure, it may be appreciated that optimization of and/or modifications to Ψ may occur during design of a given liquid impact system and/or during operation of the liquid impact system.

While the present techniques of the invention may be susceptible to various modifications and alternative forms, the exemplary embodiments discussed above have been shown only by way of example. However, it should again be understood that the invention is not intended to be limited to the particular embodiments disclosed herein. Indeed, the present techniques of the invention include all alternatives, modifications, and equivalents falling within the true spirit and scope of the invention as defined by the following appended claims.

What is claimed is:

1. A method of controlling a liquid-impact pressure on a solid body in a liquid impact system, comprising:

providing a liquid impact system including a gas and a solid body, wherein $\rho_G$ is a density of the gas, κ is a polytropic index of the gas, and $\rho_L$ is a density of the liquid;

calculating a parameter Ψ for the system, wherein Ψ is defined as $(\rho_G/\rho_L)(\kappa-1)/\kappa$; and adjusting the liquid-impact pressure by changing the parameter Ψ for the system, wherein increasing the value of the parameter Ψ decreases the liquid-impact pressure and decreasing the value of the parameter Ψ increases the liquid-impact pressure.

2. The method of claim 1 wherein changing the parameter Ψ for the system includes changing the composition of the gas in the system.

3. The method of claim 1, wherein changing the parameter Ψ for the system includes a change selected from the group consisting of 1) changing the pressure of the gas in the system, 2) changing the temperature of the gas in the system, 3) changing the composition of the liquid in the system, and 4) any combination thereof.

4. The method of claim 2 or 3 wherein the changing of the parameter Ψ occurs during design of the liquid impact system.

5. The method of claim 2 or 3 wherein the changing of the parameter Ψ occurs during operation of the liquid impact system.

6. The method of claim 2, wherein the method is executed automatically by a programmable computer system.

7. The method of claim 2, wherein the solid body is selected from the group consisting of a container and a surface.

8. The method of claim 2 or 3, wherein the method is applied to a liquid impact system selected from the group consisting of: 1) a liquid storage container system, 2) a fuel container system, 3) a manufacturing process system, 4) a vehicle coming in contact with a fluid surface, 5) a combustion system, and 6) an ink jet printing system.

9. The method of claim 2, wherein the liquid is liquefied natural gas (LNG) in an LNG container and the gas is ullage gas in the LNG container.

10. The method of claim 9, wherein changing the parameter Ψ for the system comprises changing the composition of the ullage gas by increasing the amount of an enhancement gas in the system, wherein the enhancement gas is selected from the group of gasses consisting of helium, neon, nitrogen, methane, argon, and any combination thereof.

11. The method of claim 10, further comprising increasing a release valve pressure level on a release valve on the LNG container.

12. The method of claim 3, wherein the liquid is a jet of ink from an ink jet printer cartridge and the gas is surrounding gas around the jet of ink.

13. The method of claim 3, wherein the liquid-impact pressure is the force applied to an area of a solid surface in cooperation with the liquid impact system.

14. The method of claim 2, wherein the liquid is fuel in a fuel tank and the gas is ullage gas in the fuel tank.

15. The method of any one of claims 9 and 14, wherein changing the parameter Ψ for the system further includes changing the liquid fill level.

16. A method of optimizing a liquid impact pressure of a liquid on an object in a liquid impact system, comprising:

a) determining an optimum liquid impact pressure of the liquid on the object;

b) selecting an attribute consisting of at least one of a composition of the liquid, a composition of the gas, the temperature of the system, and a gaseous pressure of the liquid impact system;

c) calculating a liquid impact pressure of the liquid on the object by determining a parameter Ψ for the system, wherein Ψ is defined as $(\rho_G/\rho_L)(\kappa-1)/\kappa$, wherein $\rho_G$ is a density of the gas, κ is a polytropic index of the gas, and $\rho_L$ is a density of the liquid;

d) comparing the optimum pressure with the calculated pressure;

e) selecting one of the following:

i) if the calculated pressure is not substantially equal to the optimum pressure: adjusting at least one of the composition of the liquid, the composition of the gas, and a gaseous pressure of the liquid impact system, and repeating steps c)-e); or ii) if the calculated pressure is substantially equal to the optimum pressure, selecting the composition of the liquid, the composition of the gas, and the gaseous pressure of the liquid impact system.

17. The method of claim 16, wherein changing the parameter Ψ for the system includes a change selected from the group consisting of 1) changing the pressure of the gas in the system, 2) changing the temperature of the gas in the system, 3) changing the composition of the gas in the system, 4) changing the composition of the liquid in the system, and 5) any combination thereof.

18. The method of claim 17, wherein the method is executed automatically by a programmable computer system.

19. The method of claim 18, wherein the object is selected from the group consisting of a container and a surface.

20. The method of claim 19, wherein the method is applied to a liquid impact system selected from the group consisting of: 1) a liquid storage container system, 2) a fuel container system, 3) a manufacturing process system, 4) a vehicle coming in contact with a fluid surface, 5) a combustion system, and 6) an ink jet printing system.

21. The method of claim 17, wherein the liquid is liquefied natural gas (LNG) in an LNG container and the gas is ullage gas in the LNG container.

22. The method of claim 21, wherein changing the parameter Ψ for the system comprises changing the composition of the ullage gas by increasing the amount of an enhancement gas in the system, wherein the enhancement gas is selected from the group of gasses consisting of helium, neon, nitrogen, methane, argon and any combination thereof.

23. The method of claim 21, further comprising increasing a release valve pressure level on a release valve on the LNG container.

24. A method of reducing a liquid impact pressure in a container, comprising:

providing a liquid impact system, comprising: a liquid, a first gas, and a container having a liquid volume filled with the liquid, and an ullage volume substantially filled with the first gas, wherein the liquid has a density $(\rho_L)$ and the gas has a density $(\rho_G)$ and a polytropic index (κ);

determining a parameter Ψ for the two-phase system, wherein the parameter Ψ is defined as $(\rho_G/\rho_L)(\kappa-1)/\kappa$, and wherein an increase in the parameter Ψ results in a decrease in the liquid-impact load on the container; and increasing the parameter Ψ in the system, comprising a step selected from the group consisting of: increasing the pressure of the first gas in the container, replacing a portion of the first gas with a selected gas having a higher parameter Ψ, increasing the liquid volume in the container, decreasing a volume of boil-off gas, wherein the volume of boil-off gas is a result of boil-off from the liquid volume, and any combination thereof.

25. The method of claim 24, wherein the selected gas has a property selected from the group consisting of: a lower boil-off temperature than the liquid, inert, non-toxic, readily available, low solubility with the liquid, and any combination thereof.

26. The method of claim 24, wherein the liquid is liquefied natural gas (LNG).

27. The method of claim 26, wherein the selected gas is selected from the group of gasses consisting of helium, neon, nitrogen, pressurized methane, argon, and any combination thereof.

28. The method of claim 27, wherein the container is an LNG container selected from the group consisting of a membrane tank, a prismatic tank, and a spherical tank.

29. The method of claim 24, further comprising:

transporting the liquid in the container;

monitoring the parameter Ψ during the transporting step;

determining if the parameter Ψ has decreased;

increasing the parameter Ψ if the parameter Ψ has decreased.

30. The method of claim 24, further comprising:

off-loading the liquid in the container;

monitoring the parameter Ψ during the transporting step;

determining if the parameter Ψ has decreased;

increasing the parameter Ψ if the parameter Ψ has decreased.

31. The method of claim 24, further comprising:

on-loading the liquid in the container;

monitoring the parameter Ψ during the transporting step;

determining if the parameter Ψ has decreased;

increasing the parameter Ψ if the parameter Ψ has decreased.

32. The method of any one of claims 30 and 31, wherein the off-loading and on-loading steps occur at an off-shore location.

33. The method of claim 24, wherein the method is executed automatically by a programmable computer system.

34. A system for reducing a liquid impact load in a container, comprising:

a liquid impact system, comprising:

(i) a volume of liquid in a container, the liquid having at least a density ($\rho_L$);

(ii) an ullage volume in the container containing at least an initial ullage gas, the initial ullage gas having at least a density ($\rho_G$) and a polytropic index (κ);

a sensor system configured to determine at least the volume of liquid, the ullage volume, the liquid density ($\rho_L$), an ullage gas density ($\rho_G$), and an ullage gas polytropic index (κ);

a calculator configured to calculate a parameter Ψ for the liquid impact system, wherein Ψ is defined as $(\rho_G/\rho_L)(\kappa-1)/\kappa$ and an increase in the parameter Ψ results in a decrease in a liquid impact load in the container; and a controller configured to control at least one physical attribute of the liquid impact system to increase the value of the parameter Ψ.

35. The system of claim 34, further comprising a selector operatively connected to the controller, the selector configured to select a low-load ullage gas, wherein the low-load ullage gas is calculated to have a higher parameter Ψ than the ullage gas.

36. The system of claim 35, wherein the physical attributes of the liquid impact system are selected from the group consisting of: the volume of the ullage gas in the ullage volume, the pressure of the ullage gas in the container, the parameter Ψ of the ullage gas, the liquid volume in the container, a volume of boil-off gas, wherein the volume of boil-off gas is a result of boil-off from the liquid volume, and any combination thereof.

37. The system of claim 35, further comprising:

an ullage gas storage tank in fluid communication with the container;

an ullage gas pump for filling the container with one of the ullage gas and the low-load ullage gas.

38. The system of claim 34, wherein the calculator is an automated computing device and the controller is an automated control system.

* * * * *